United States Patent
Jana et al.

(10) Patent No.: US 9,954,649 B2
(45) Date of Patent: Apr. 24, 2018

(54) SYSTEM AND METHOD FOR HARQ IN CLOUD RAN WITH LARGE FRONT HAUL LATENCY

(71) Applicant: AT&T Intellectual Property I, L.P., Atlanta, GA (US)

(72) Inventors: Rittwik Jana, Montville, NJ (US); Ratnesh Kumbhkar, Piscataway, NJ (US); Arunabha Ghosh, Austin, TX (US); Milap V. Majmundar, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 96 days.

(21) Appl. No.: 14/699,774

(22) Filed: Apr. 29, 2015

(65) Prior Publication Data

US 2016/0323067 A1 Nov. 3, 2016

(51) Int. Cl.
*H04L 1/18* (2006.01)
*H04L 1/16* (2006.01)

(52) U.S. Cl.
CPC .......... *H04L 1/1607* (2013.01); *H04L 1/1812* (2013.01)

(58) Field of Classification Search
CPC ..... H04L 29/06; H04L 47/193; H04L 69/163; H04L 69/16; H04L 47/283
See application file for complete search history.

(56) References Cited

U.S. PATENT DOCUMENTS

| | | | |
|---|---|---|---|
| 5,677,918 A | 10/1997 | Tran et al. | |
| 6,735,180 B1 | 5/2004 | Malkamaki et al. | |
| 6,901,063 B2 | 5/2005 | Vayanos et al. | |
| 7,310,336 B2 | 12/2007 | Malkamaki | |
| 7,385,951 B2 | 6/2008 | Balachandran et al. | |
| 8,051,353 B2 | 11/2011 | Maas et al. | |
| 8,271,842 B2 | 9/2012 | Nagaraja | |
| 8,611,283 B2 | 12/2013 | Teague | |
| 8,670,377 B2 | 3/2014 | Yi et al. | |
| 8,751,891 B2 | 6/2014 | Park et al. | |
| 8,751,893 B2 | 6/2014 | Lohr et al. | |
| 8,930,785 B2 | 1/2015 | Sung et al. | |
| 2003/0227875 A1 | 12/2003 | Wei et al. | |

(Continued)

FOREIGN PATENT DOCUMENTS

| | | |
|---|---|---|
| EP | 2549662 A2 | 1/2013 |
| EP | 2549676 A2 | 1/2013 |
| EP | 2632072 A1 | 8/2013 |

OTHER PUBLICATIONS

NN8804166 : 'Software-Based Error Control for Personal Systems Communications Links;' IBM Technical Disclosure Bulletin, Apr. 1988, vol. 30, Issue: 11, pp. 166-171.*

(Continued)

*Primary Examiner* — Guy Lamarre

(74) *Attorney, Agent, or Firm* — Amin, Turocy & Watson, LLP

(57) ABSTRACT

A system is enabled to perform error checking and other HARQ processes at a remote radio unit device in cloud RAN systems that have a large front haul latency. The remote radio unit device performs error checking on transmissions received from a mobile device and sends an acknowledgement (ACK) or negative acknowledgement (NACK) to the mobile device based on whether errors are found.

20 Claims, 10 Drawing Sheets

(56) References Cited

U.S. PATENT DOCUMENTS

| | | | |
|---|---|---|---|
| 2007/0008884 A1* | 1/2007 | Tang | H04L 29/06 370/230 |
| 2008/0181170 A1* | 7/2008 | Branlund | H04B 1/71052 370/328 |
| 2009/0245421 A1 | 10/2009 | Montojo et al. | |
| 2010/0077272 A1 | 3/2010 | Peisa et al. | |
| 2010/0272033 A1* | 10/2010 | Fwu | H04L 1/1835 370/329 |
| 2012/0183093 A1* | 7/2012 | Zhu | H04B 7/024 375/285 |
| 2014/0105224 A1 | 4/2014 | Frederiksen et al. | |
| 2014/0133475 A1* | 5/2014 | Hong | H04W 72/121 370/336 |
| 2014/0185496 A1 | 7/2014 | Wolf et al. | |
| 2014/0211746 A1 | 7/2014 | Lohr et al. | |
| 2014/0293889 A1 | 10/2014 | Mahr et al. | |
| 2015/0188604 A1* | 7/2015 | Branlund | H04B 1/71052 370/329 |
| 2016/0119087 A1* | 4/2016 | Rost | H04L 1/1812 370/328 |

OTHER PUBLICATIONS

"Cisco Visual Networking Index: Global Mobile Data Traffic Forecast Update", 2013-2018, White Paper, Cisco, Feb. 2014.
"Small cells-what's the big idea?" White Paper, Small Cell Forum, Feb. 2012.
"C-RAN: The road towards green RAN, version 3.0," White Paper, China Mobile Research Institute, Dec. 2013.
Q. Wang, D. Jiang, J. Jin, G. Liu, Z. Yan, and D. Yang, "Application of bbu+rru based comp system to lte-advanced," in Communications Workshops, 2009. ICC Workshops 2009. IEEE International Conference on, Jun. 2009, pp. 1-5.
S. Bhaumik, S. P. Chandrabose, M. K. Jataprolu, G. Kumar, A. Muralidhar, P. Polakos, V. Srinivasan, and T. Woo, "Cloudiq: A framework for processing base stations in a data center," in Proceedings of the 18th Annual International Conference on Mobile Computing and Networking, ser. Mobicom '12, 2012, pp. 125-136.
J. Andrews, "Interference cancellation for cellular systems: a contemporary overview," Wireless Communications, IEEE, vol. 12, No. 2, pp. 19-29, Apr. 2005.
C. Liu, K. Sundaresan, M. Jiang, S. Rangarajan, and G.-K. Chang, "The case for re-configurable backhaul in cloud-ran based small cell networks," in INFOCOM, 2013 Proceedings IEEE, Apr. 2013, pp. 1124-1132.
3GPP, "Evolved Universal Terrestrial Radio Access (E-UTRA); Medium Access Control (MAC) protocol specification," 3rd Generation Partnership Project (3GPP), TS 36.321, Jul. 2014. [Online]. Available: http://www.3gpp.org/ftp/Specs/html-info/36321.htm, last accessed Nov. 2, 2015.

* cited by examiner

SYSTEM AND METHOD FOR HARQ IN CLOUD RAN WITH LARGE FRONT HAUL LATENCY

TECHNICAL FIELD

The subject disclosure relates to a system for enhanced hybrid automatic repeat request to decrease latency in systems with large front haul latency in a mobile communications environment.

BACKGROUND

Hybrid automatic repeat request (HARQ) is a system of error checking where transmissions from mobile devices are checked for errors. If the transmission contains an error, a retransmission request is sent back to the mobile device to resend the transmission. In synchronous uplink systems, there are standards for scheduling so that a certain amount of time is allotted to send the retransmission requirement. The system that performs the HARQ has traditionally been the baseband unit of an eNodeB in an LTE system.

Due to increasing demand, small cell deployments are being developed with cloud radio access network (RAN) systems, where a portion of a base station device (e.g., the baseband unit device of the eNodeB) may support multiple remote radio unit devices. The remote radio unit devices, which are primarily used for transmission and reception of radio signals from mobile devices, may be located at some distance from the baseband units, physical or virtual, and so the increased latency due to the distance between the devices may negatively affect HARQ performance.

DETAILED DESCRIPTION

Figure 1:
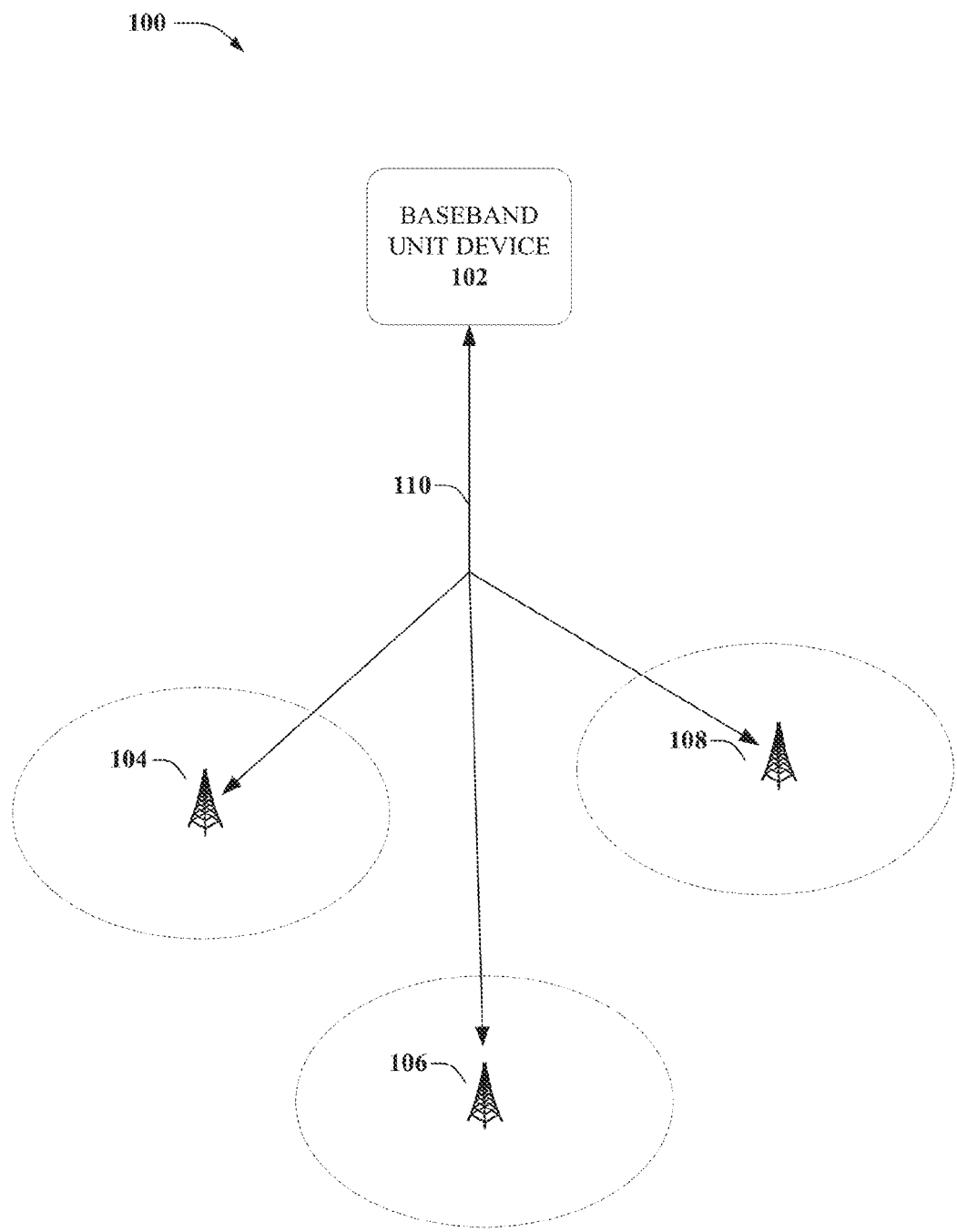
FIG. 1 is an example, non-limiting embodiment of a block diagram showing a system showing multiple remote radio unit devices being supported by a baseband unit device in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

A system is provided to perform error checking and other HARQ processes at a remote radio unit device in cloud RAN systems that have a large front haul latency. The remote radio unit device performs error checking on transmissions received from a mobile device and sends an acknowledgement (ACK) or negative acknowledgement (NACK) to the mobile device based on whether errors are found. In another embodiment, the remote radio unit device can send an interim ACK to the mobile device, and then send a retransmission request if the baseband unit device determines that there is an error in transmission. Both of these techniques allow for improved uplink throughput even in systems where there may be a high latency fronthaul connection.

In an embodiment, if a remote radio unit device is located at a great enough distance from a baseband unit device that the latency in the connection interferes with scheduling requirements for HARQ processing, a remote radio unit device can be provided that performs error checking at the remote radio unit device, without waiting to hear back from the baseband unit device whether transmissions contain errors. The remote radio unit device can send an ACK or NACK to the mobile device directly. By enabling the remote radio unit device to perform error checking, the ACK and NACK can be sent within the three millisecond time period that is required for synchronous uplink retransmission.

In another embodiment, the remote radio unit device can send an interim or provisional acknowledgement to the mobile device upon reception of a transmission. The interim acknowledgement can be sent to the mobile device within the three millisecond time frame provided by the LTE HARQ standards, even if the remote radio unit device has not already determined whether the transmission contains an error. If the transmission does not contain an error, an additional acknowledgement may not need to be sent, but if the transmission does contain an error, a retransmission request can be sent after the interim acknowledgement was sent. In an embodiment, the interim acknowledgement can be sent if the remote radio unit device is not able to perform the error checking within time, or if a latency between the baseband unit device and the remote radio unit device is above a predetermined threshold.

For these considerations as well as other considerations, in one or more embodiments, a remote radio unit device can comprise a processor and a memory that stores executable instructions that, when executed by the processor, facilitate performance of operations. The operations can include receiving a transmission from a mobile device and determining whether the transmission comprises an error. The operations can also include, in response to the determining indicating that the transmission does not comprise the error, sending an acknowledgement to the mobile device and in response to the determining indicating that the transmission does comprise the error, sending a retransmission request to the mobile device.

In another embodiment, a method can include receiving, by a remote radio unit device comprising a processor, a transmission from a mobile device. The method can also include performing, by the remote radio unit device, error detection on the transmission. The method can also include, in response to not detecting an error, sending, by the remote radio unit device, an acknowledgement to the mobile device, or in response to detecting the error, sending, by the remote radio unit device, a retransmission request to the mobile device.

In yet another embodiment, a computer-readable storage device storing executable instructions that, in response to execution, cause a system comprising a processor to perform operations. The operations can include receiving a transmission from a mobile device. The operations can also include determining whether the transmission comprises an error, wherein the determining is performed at a remote radio unit. The operations can further include sending an acknowledgement in response to the determining indicating that the transmission does not comprise the error or sending a retransmission request in response to the determining indicating that the transmission does comprise the error.

Turning now to FIG. 1, illustrated is an example, non-limiting embodiment of a block diagram 100 showing a system showing multiple remote radio unit devices 104, 106, and 108 being supported by a baseband unit device 102 in accordance with various aspects described herein. A fronthaul link 110 connects the remote radio units 104, 106, and 108, and the latency of the fronthaul link 110 can vary depending on how far away the remote radio unit devices are from the baseband unit device 102.

The uplink connection from a mobile device to the eNodeB, which comprises both the remote radio unit devices 104, 106, and 108 and the baseband unit device 102 is synchronous according to current 3GPP specifications. This reduces the interaction between the mobile device and the eNodeB, and simplifies the operation for mobile device as well. However, to meet the requirement of synchronous uplink retransmission, the eNodeB may need to complete the processing of uplink channel data within a 3 ms time period so that if a retransmission needs to be sent, the eNodeB can alert the mobile device to resend the transmission by the eighth transmission time interval, or 8 ms after the first transmission was sent. If this time requirement is not met, the mobile device cannot resend the data until the sixteenth transmission time interval, or 16 ms after the first transmission is sent, which can slow down the uplink throughput bandwidth.

If there is a large distance between remote radio units 104, 106, and 108 and the baseband unit device 102, or if baseband unit device 102 is provided as a cloud service, there can be a large fronthaul delay on connection 110 such that the 3 ms processing time may not be realized for HARQ error detection at the baseband unit device 102. In order to overcome this difficulty, error detection can be implemented at the remote radio unit devices 104, 106, and 108 so that the latency caused due to connection 110 is no longer relevant. In addition, the remote radio unit devices can issue interim acknowledgements so that new data is transmitted every 8 ms, but if an error is detected, then a retransmission request can be sent by the remote radio unit device to the mobile device. This retransmission request can be sent at a later time, and the mobile device can retransmit data that was stored in a buffer on the mobile device.

Figure 2:
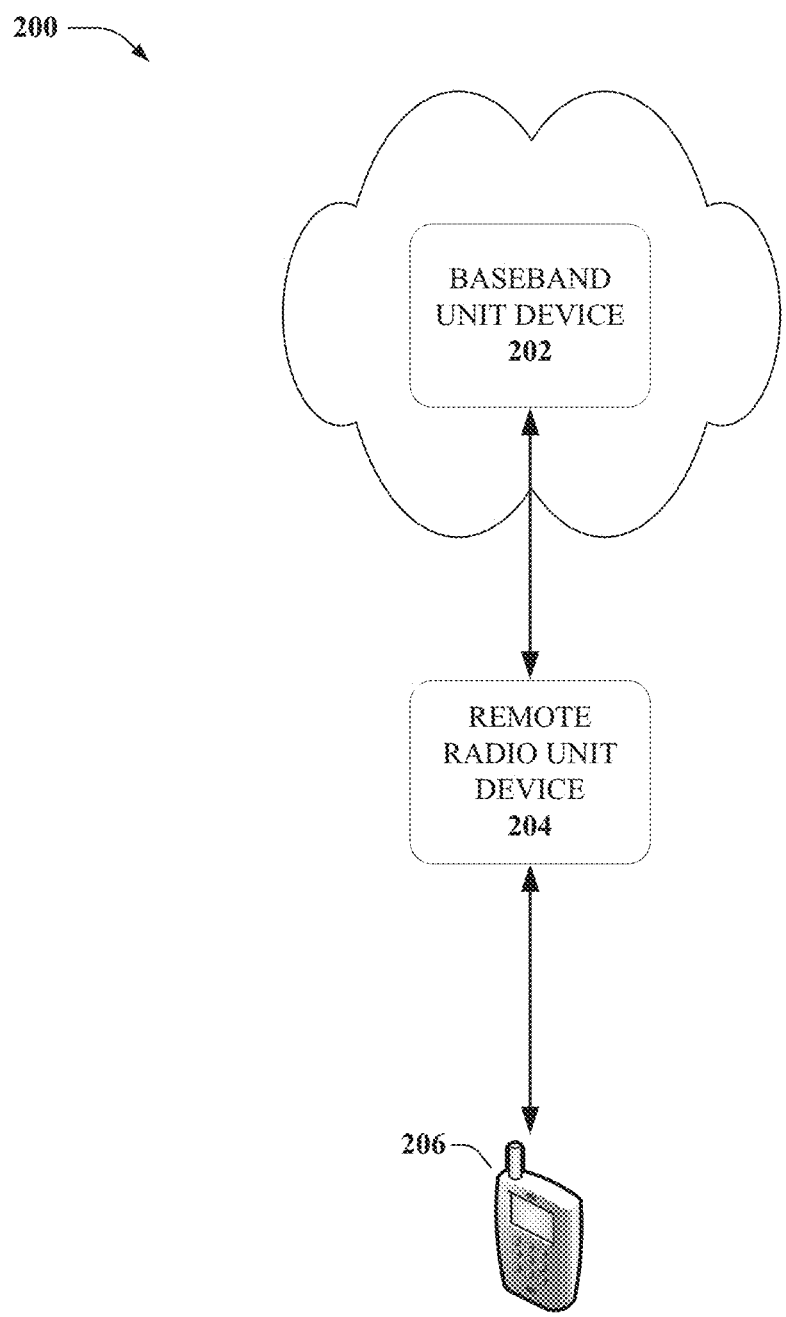
FIG. 2 is an example, non-limiting embodiment of a block diagram showing a system for error checking in a cloud RAN in accordance with various aspects described herein.

Turning now to FIG. 2, illustrated is an example, non-limiting embodiment of a block diagram 200 showing a system for error checking in a cloud RAN in accordance with various aspects described herein.

In an embodiment, if an eNodeB is split with a local remote radio unit device 204 and a cloud provisioned baseband unit device 202 such that a latency in the connection interferes with scheduling requirements for HARQ processing, the remote radio unit device can performs error checking at the remote radio unit device 204, without waiting to hear back from the baseband unit device 202 whether transmissions contain errors. The remote radio unit device can send an ACK or NACK to the mobile device 206 directly. By enabling the remote radio unit device 204 to perform error checking, the ACK and NACK can be sent within the three millisecond time period that is required for synchronous uplink retransmission.

In an embodiment, the mobile device 206 can send transmissions that are encoded with an error detecting code such as cyclic redundancy check. The remote radio unit device 204 can check for errors based on the error detecting code, and if there are errors, request a retransmission. In other embodiments, the mobile device 206 can send transmissions that are encoded with a forward error correction code and an error detecting code (e.g., Reed-Solomon code). The forward error correction code can be used by the remote radio unit device 204 to decode the data and/or correct errors in the transmission, and retransmission is only requested in case if the errors in the transmission are uncorrectable.

In a typical eNodeB, the general operational split between the remote radio unit and the baseband unit is that the remote radio unit performs layer 1 processing, while the baseband unit performs layer 2 processing and above. In an embodiment of the subject disclosure though, the remote radio unit device 204 can perform some layer 2 processing on transmissions received from mobile device 204.

In an embodiment, remote radio unit device 204 can include part of the scheduler of the eNodeB handles retransmission of data, while the part of the scheduler that resides in the baseband unit device 202 handles new transmissions. Since the HARQ retransmission may need to follow time constraints imposed by the synchronous standards, the retransmission can be handled at the remote radio unit device 204 without the latency imposed by the connection to the baseband unit device 202 in the cloud RAN. In an embodiment, the remote radio unit device 204 can receive scheduling information associated with the new transmission from the baseband unit device 202. The scheduling information can provide a schedule for requesting new transmissions from the mobile device 206 and can include intervals, or breaks between the new transmissions requests to allow for the retransmission requests determined, and generated by remote radio unit device 204. The number of intervals, interval rate, or the length of the intervals can be adjusted based on the expected or realized error rate of transmissions received from the mobile device 206. For instance, if environmental conditions, or loading, or interference, are such that the error rate is measured or expected to be higher, the baseband unit device 202 can send scheduling information to the remote radio unit device 204 that has an increased number of intervals to account for the higher number of retransmission requests.

In an embodiment, an interim acknowledgement can be sent from the remote radio unit device 204 to the mobile device 206 regardless of whether an error has been detected or not. If the fronthaul delay in overall processing at both the remote radio unit device 204 and the baseband unit device 202 is greater than 3 ms, then the interim acknowledgment can be sent on a physical HARQ indicator channel (PHICH). The remote radio unit device 204 can either ask for a retransmission of data or a new data transmission using a toggled new data indicator bit on a Physical Downlink Control Channel (PDCCH) after the data received in the transmission on the Physical Uplink Shared Channel (PUSCH) is received.

In an embodiment, the remote radio unit device 204 can initiate checking for errors, and if the processing is finished within 3 ms, the remote radio unit device 204 can send the ACK/NACK on PHICH. If the processing, either at the baseband unit device 202 or at remote radio unit device 204, has not been performed within the time frame, the remote radio unit device 204 can send a temporary or interim ACK on PHICH. The interim acknowledgement prevents unnecessary retransmissions, since the mobile device 206 will retransmit unless an ACK is received. When the ACK is received, interim or not, the mobile device 206 can buffer the transmission for a short time, and if a NACK or a retransmission request related to the first transmission is received, the mobile device 206 can retransmit the buffered data.

In the case when a NACK is supposed to be sent, the dummy ACK halts the process of non-adaptive retransmission but it gives more control for later retransmission, requested on PDCCH with possibly different resource blocks and MCS, while using less number of retransmissions.

In another embodiment, the remote radio unit device 204 can check for HARQ transmission errors in transmissions from the mobile device 206 at the remote radio unit device 204. If data is received without errors, then an ACK can be sent on PHICH to the mobile device 206, and if a retransmission is required by the baseband unit device 202, the remote radio unit device 204 can send a indicator to 0 on downlink control information (DCI format 0) on PDCCH. If an error is detected however at the remote radio unit 204, then the remote radio unit device 204 can itself send a NACK on PHICH.

Figure 3:
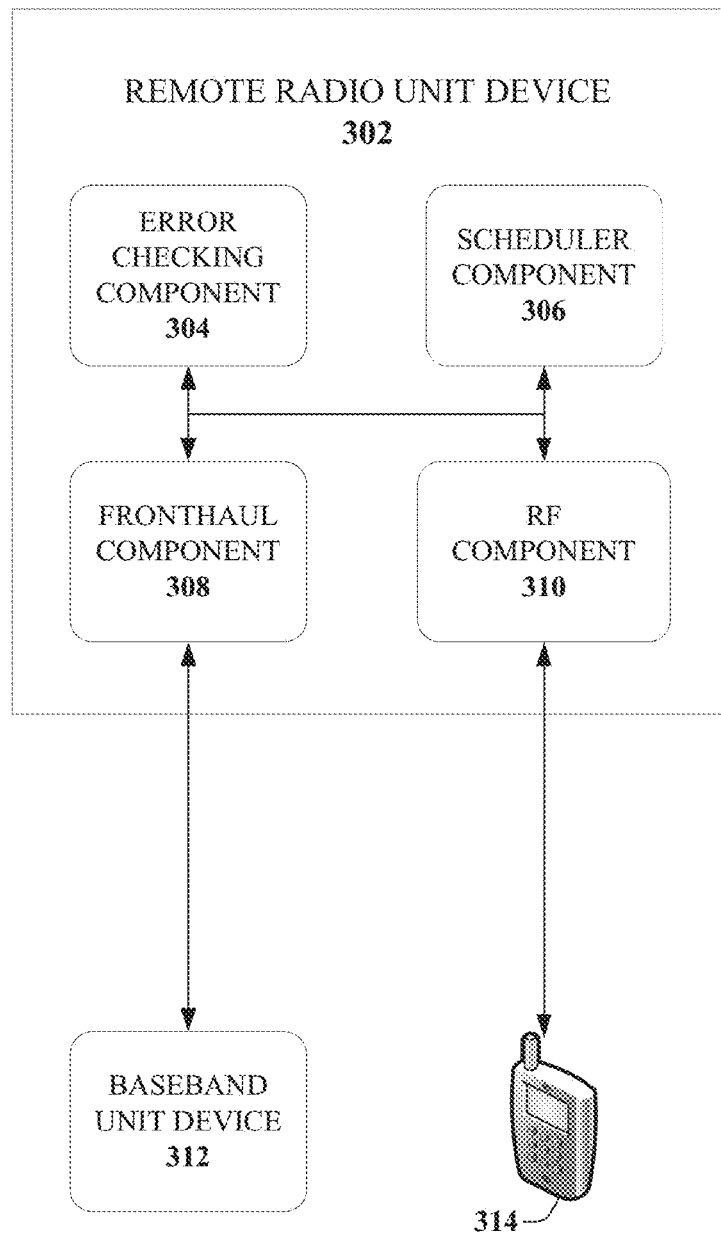
FIG. 3 is an example, non-limiting embodiment of a block diagram showing a remote radio unit device in accordance with various aspects described herein.

Turning now to FIG. 3, illustrated is an example, non-limiting embodiment of a block diagram 300 showing a remote radio unit device 302 in accordance with various aspects described herein.

In an embodiment, if an eNodeB is split with a local remote radio unit device 302 and a cloud provisioned baseband unit device 312 such that a latency in the connection interferes with scheduling requirements for HARQ processing, the remote radio unit device 302 can performs error checking at the remote radio unit device 302, without waiting to hear back from the baseband unit device 312 whether a transmission from a mobile device 314 contains an error. The remote radio unit device 302 can send an ACK or NACK to the mobile device 314 directly. By enabling the remote radio unit device 302 to perform error checking, the ACK and NACK can be sent within the three millisecond time period that is required for synchronous uplink retransmission.

In an embodiment, an RF component 310 can receive a transmission from mobile device 314 via a radio frequency (RF) connection. An error checking component 304 can begin to check the transmission for errors. The error checking component 304 can check for errors based on an error detecting code that was encoded with the data in the transmission, and if there are errors, request a retransmission. In other embodiments, the error checking component 304 can try to correct the errors using a forward error correcting code that was encoded with the data and request a retransmission if the data is uncorrectable.

In an embodiment, a fronthaul component 308 can transmit the received data to the baseband unit device 312 via a fronthaul link. The baseband unit device 312 can also perform HARQ processing, and initiate a retransmission or new data transmission via the fronthaul component 308. A scheduler component 306 can monitor the length of time between receiving the transmission at the RF component 310 the error checking processing by the error checking component 304. If the scheduler component 306 determines that the 3 ms time period for sending an ACK/NACK will not be met, the scheduler component 306 can initiate sending of an ACK to the mobile device 314 via the RF component 310. The ACK can be an interim ACK, and if the error checking component 304 determines that there is an error, a retransmission request can be sent to the mobile device 314.

In an embodiment, the error checking component 304 can determine whether or not the transmission contains an error within 3 ms, and an ACK can be sent if no error is found, or an NACK can be sent if an error is found.

In an embodiment, the scheduler component 306 can determine the latency between the baseband unit device 312 and the remote radio unit device 302. If the latency is small/low enough that the baseband unit device 312 can perform HARQ processing on data within the time constraints imposed by synchronous uplink standards, then the remote radio unit device 302 will just perform layer 1 processing on the transmissions received from mobile device 314 and forward the transmissions to the baseband unit device 312 for all layer 2 and above processing. If scheduler component 306 determines that the latency is high enough that the HARQ processing at the baseband unit device 312 will not meet the time requirements, then the scheduler component 306 can initiate error checking at the remote radio unit device 302 by error checking component 304.

Figure 4:
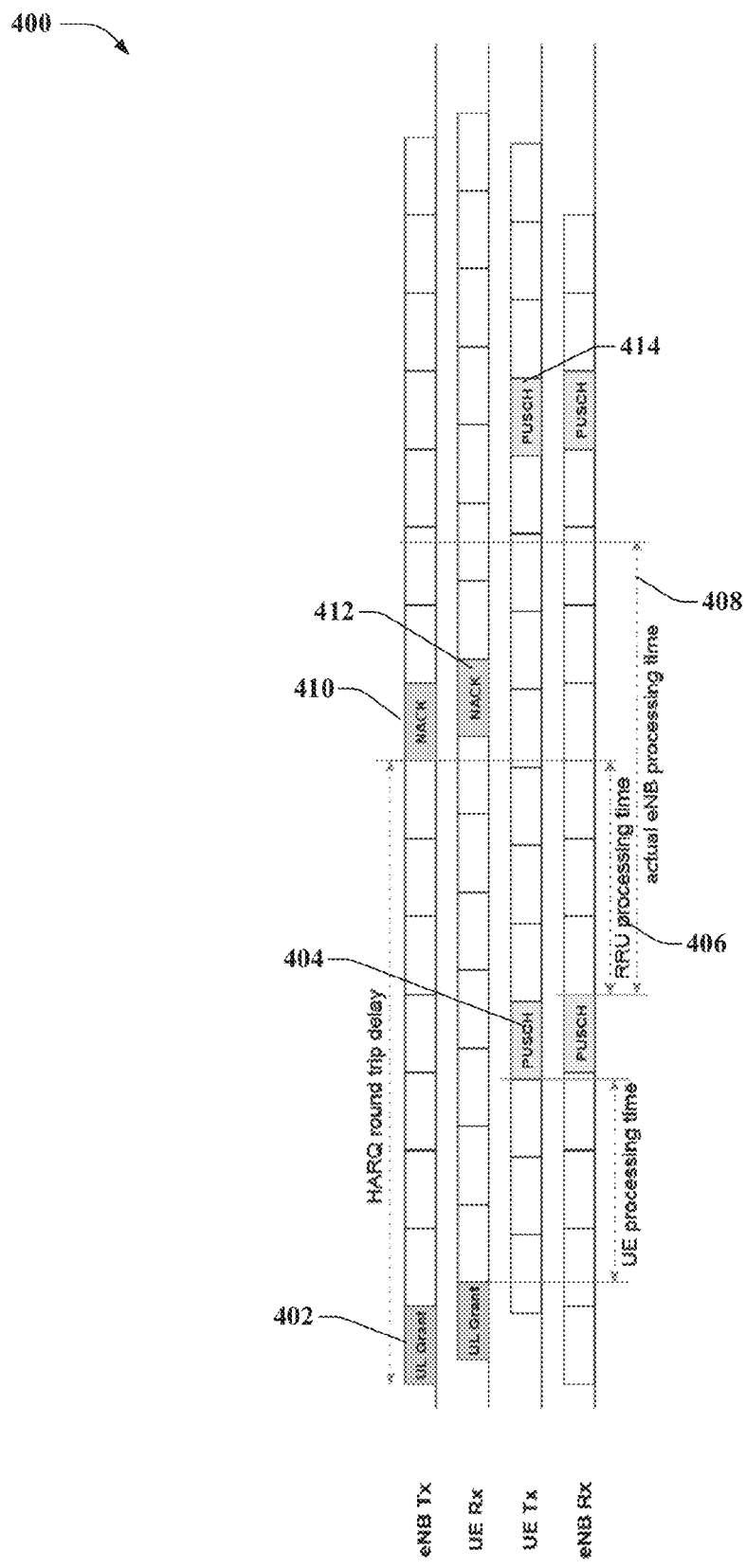
FIG. 4 is an example, non-limiting embodiment of a block diagram showing a timeline for error checking in accordance with various aspects described herein.

Turning now to FIG. 4, illustrated is an example, non-limiting embodiment of a block diagram showing a timeline 400 for error checking in accordance with various aspects described herein. The timeline 400 shown in FIG. 4 illustrates an embodiment where the remote radio unit performs error checking and sends a NACK indicating that an error has been found.

In an embodiment, each of the time period divisions in the timeline 400 indicate a transmission time interval of 1 ms. There are 8 TTIs, or 8 ms between when the UE, or the mobile device, can send packets of data to the remote radio unit. At 402, the eNodeB, or more specifically, the RRU, sends an uplink grant to the mobile device where it is received shortly thereafter. At 404, the UE transmits the data on PUSCH and it is received by the RRU shortly thereafter. At 406, after the PUSCH data is received, the remote radio unit can begin processing the transmission to check for errors. At 410, after the RRU determines that there is an error, the NACK can be sent to the mobile device where it is received at 412 which gives time for the mobile device to resend the transmission at 414.

If the RRU did not check for errors, the time period 408 denotes the length of time for processing by the BBU, which may not give enough time for the mobile device to resend the data 414. If the mobile device misses the 414 time period, it may have to wait another 8 TTIs to resend the data, thus causing a 16 ms delay in case of transmission errors, versus an 8 ms delay if the RRU is performing error checking.

Figure 5:
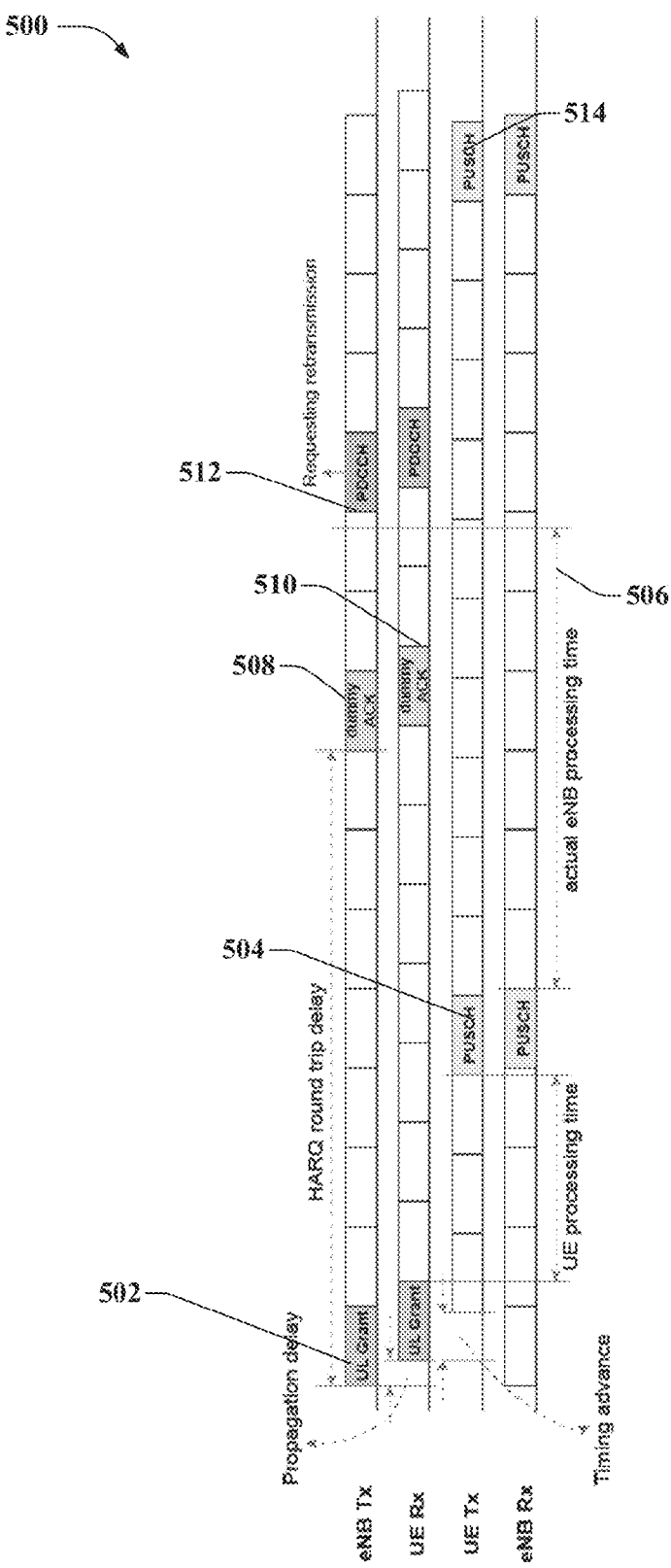
FIG. 5 is an example, non-limiting embodiment of a block diagram showing a timeline for error checking in accordance with various aspects described herein.

Turning now to FIG. 5, illustrated is an example, non-limiting embodiment of a block diagram showing a timeline 500 for error checking in accordance with various aspects described herein. The timeline 500 shown in FIG. 5 illustrates an embodiment where the remote radio unit sends an interim acknowledgement.

In an embodiment, each of the time period divisions in the timeline 500 indicate a transmission time interval of 1 ms. There are 8 TTIs, or 8 ms between when the UE, or the mobile device, can send packets of data to the remote radio unit. At 502, the eNodeB, or more specifically, the RRU, sends an uplink grant to the mobile device where it is received shortly thereafter. At 504, the UE transmits the data on PUSCH and it is received by the RRU shortly thereafter. At 508, after the PUSCH data is received, the remote radio unit sends a dummy, or interim acknowledgement, even though the HARQ processing by the eNodeB is still being performed as shown at 506. At 512, after the eNodeB processing finished, the RRU can send a retransmission request on PDCCH and the mobile device can resend the transmission at 514.

Figure 6:
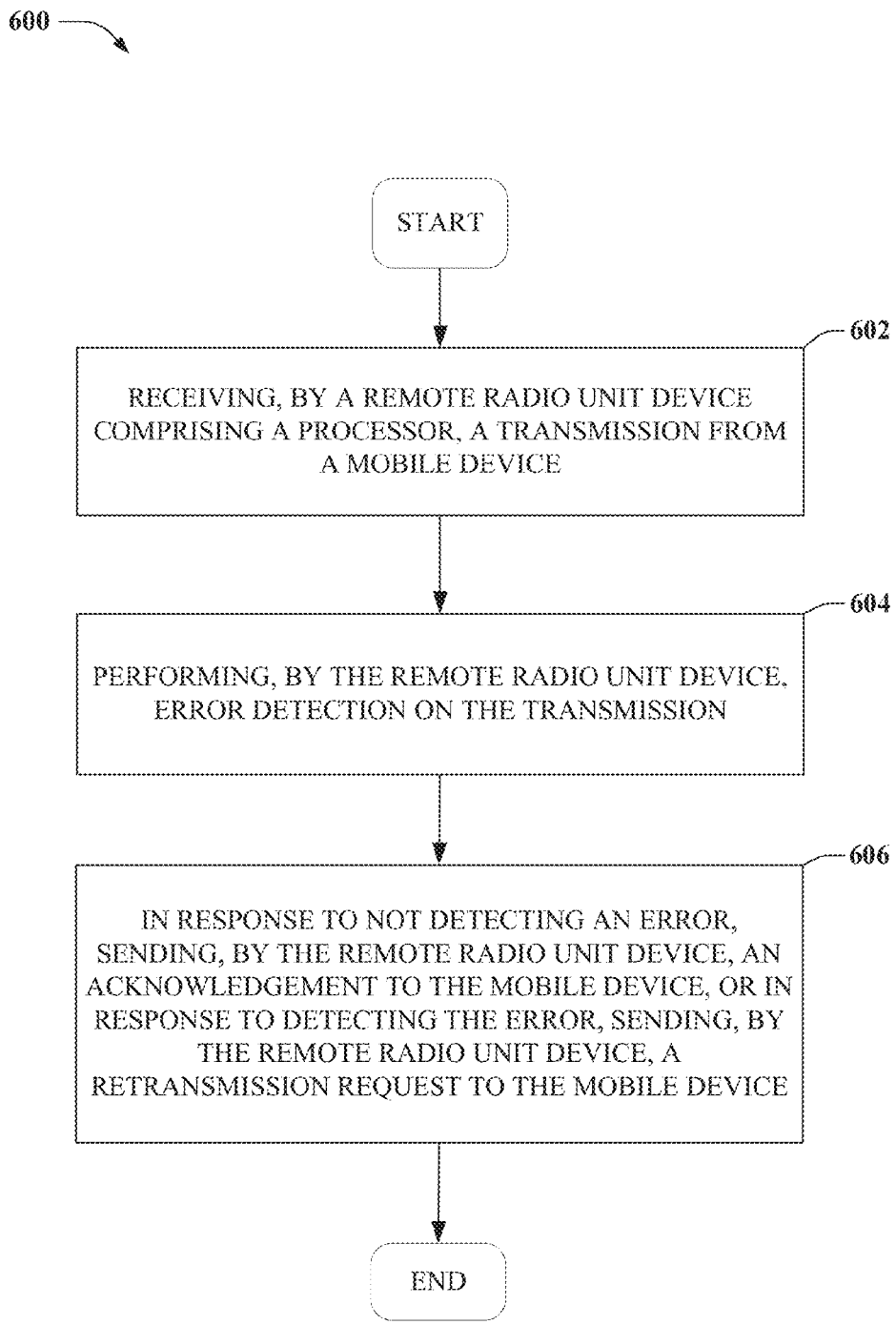
FIG. 6 illustrates a flow diagram of an example, non-limiting embodiment of a method for error checking at a remote radio unit device as described herein.
Figure 7:
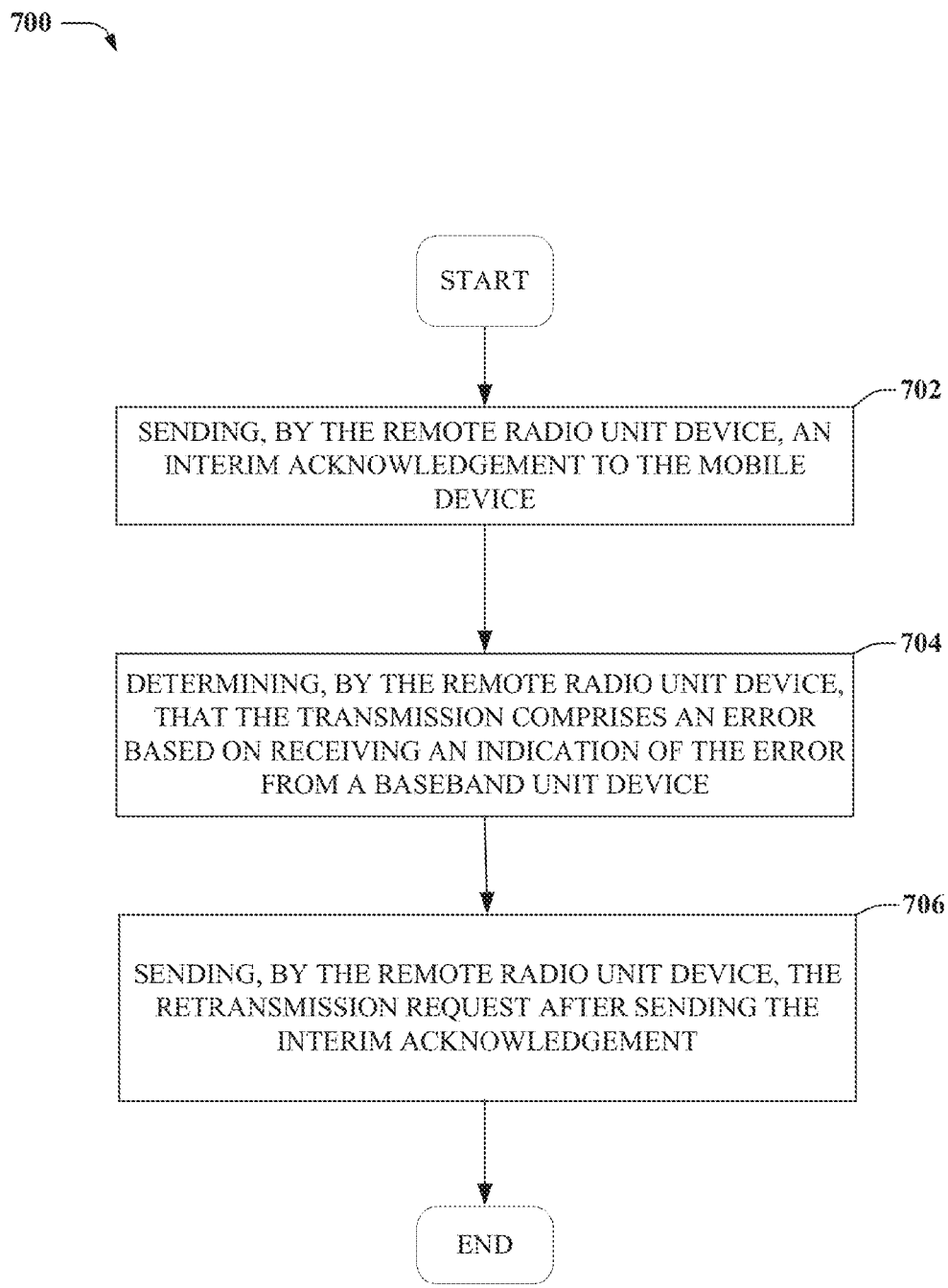
FIG. 7 illustrates a flow diagram of an example, non-limiting embodiment of a method for error checking at a remote radio unit device as described herein.
Figure 8:
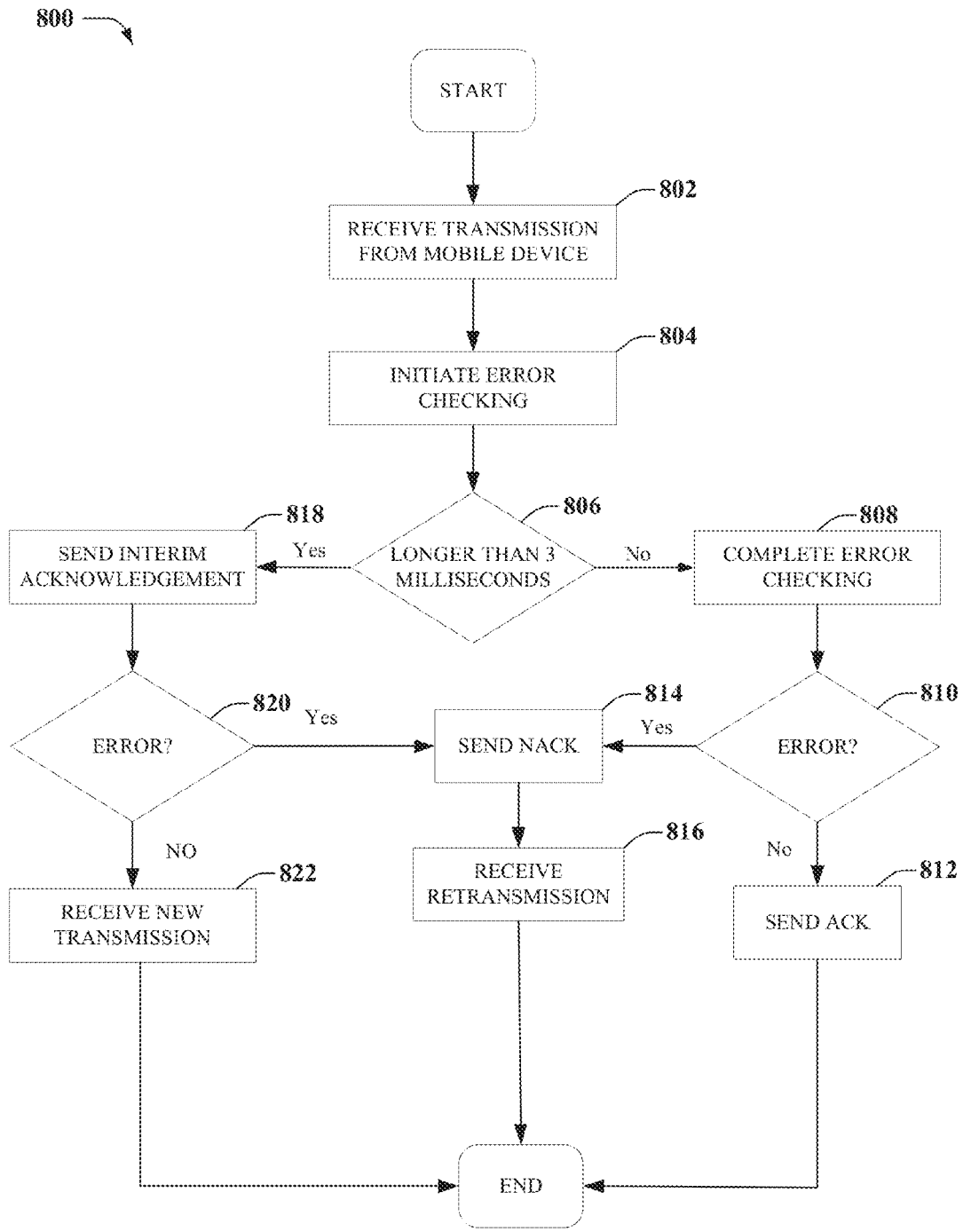
FIG. 8 illustrates a flow diagram of an example, non-limiting embodiment of a method for error checking at a remote radio unit device as described herein.

FIGS. 6-8 illustrates a process in connection with the aforementioned systems. The processes in FIGS. 6-8 can be implemented for example by systems 100-300 as illustrated in FIGS. 1-3 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 6 illustrates a flow diagram of an example, non-limiting embodiment of a method for error checking at a remote radio unit device as described herein. The method 600 can begin at 602 where the method includes receiving, by a remote radio unit device comprising a processor, a transmission from a mobile device. At 604, the method includes performing, by the remote radio unit device, error detection on the transmission. An error checking component can begin to check the transmission for errors at the remote radio unit device. The error checking component can check for errors based on an error detecting code that was encoded with the data in the transmission, and if there are errors, request a retransmission. In other embodiments, the error checking component can try to correct the errors using a forward error correcting code that was encoded with the data and request a retransmission if the data is uncorrectable.

At 606, the method includes in response to not detecting an error, sending, by the remote radio unit device, an acknowledgement to the mobile device, or in response to detecting the error, sending, by the remote radio unit device, a retransmission request to the mobile device.

FIG. 7 illustrates a flow diagram of an example, non-limiting embodiment of a method 700 for error checking at a remote radio unit device as described herein. The method 700 can begin at 702 where the method includes sending, by the remote radio unit device, an interim acknowledgement to the mobile device. At 704, the method can include determining, by the remote radio unit device, that the transmission comprises an error based on receiving an indication of the error from a baseband unit device. At 706, the method can include sending, by the remote radio unit device, the retransmission request after sending the interim acknowledgement.

FIG. 8 illustrates a flow diagram of an example, non-limiting embodiment of a method 800 for error checking at a remote radio unit device as described herein.

At 802 the method can begin with the remote radio unit device receiving a transmission from a mobile device, and at 804 the remote radio unit device can initiate error checking. An error checking component on the remote radio unit device can begin to check the transmission for errors at the remote radio unit device. The error checking component can check for errors based on an error detecting code that was encoded with the data in the transmission, and if there are errors, request a retransmission. In other embodiments, the error checking component can try to correct the errors using a forward error correcting code that was encoded with the data and request a retransmission if the data is uncorrectable.

At 806, a scheduling function of the remote radio unit device can determine whether the error checking is going to take longer than 3 milliseconds. The length can be based on the type and/or complexity of the error checking. The duration of the error checking can also be based on a fronthaul latency between the remote radio unit device and the baseband unit device.

If the scheduler determines that the error checking will take less than 3 milliseconds, then the error checking is completed at the RRU at 808 and then it is determined whether there is an error at 810. If there is an error, a NACK is transmitted to the mobile device at 814, and a retransmission is then received a short time later at 816. If there is no error, then an ACK is sent at 812.

If the scheduler determines that the error checking will take longer than 3 seconds, then an interim acknowledgement can be sent at 818. Once the error checking is completed it is determined whether an error is present at 820. If there is an error, than a NACK can be sent, but if there is no error, than nothing needs to be done, and a new transmission can be received at 822.

Figure 9:
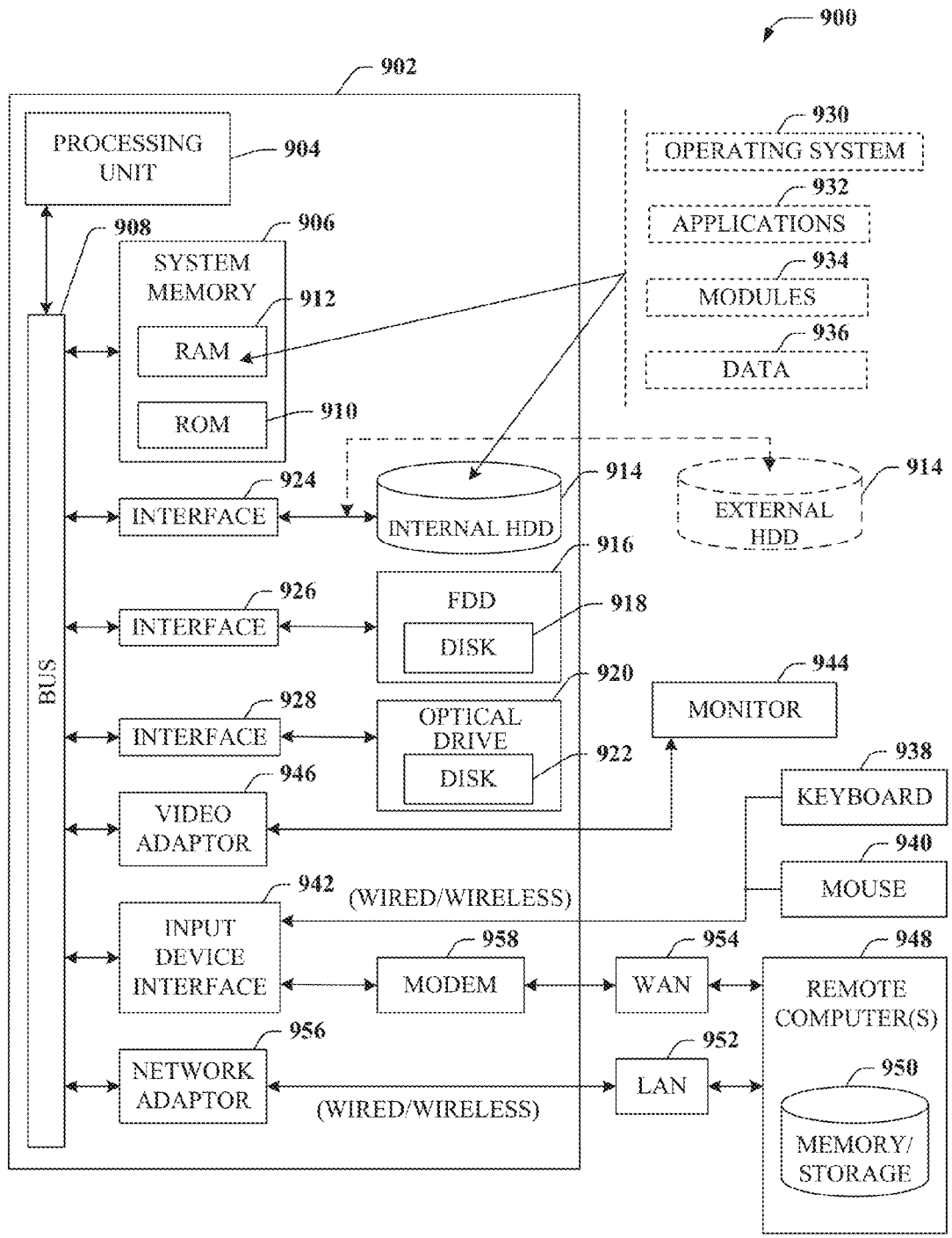
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, the computer can be or be included within the remote radio unit device 104, 106, 108, 204, or 302 or within the baseband unit device 102, 202, or 312.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless AP disposed thereon for communicating with the wireless adapter 956.

When used in a WAN networking environment, the computer 902 can include a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

Figure 10:
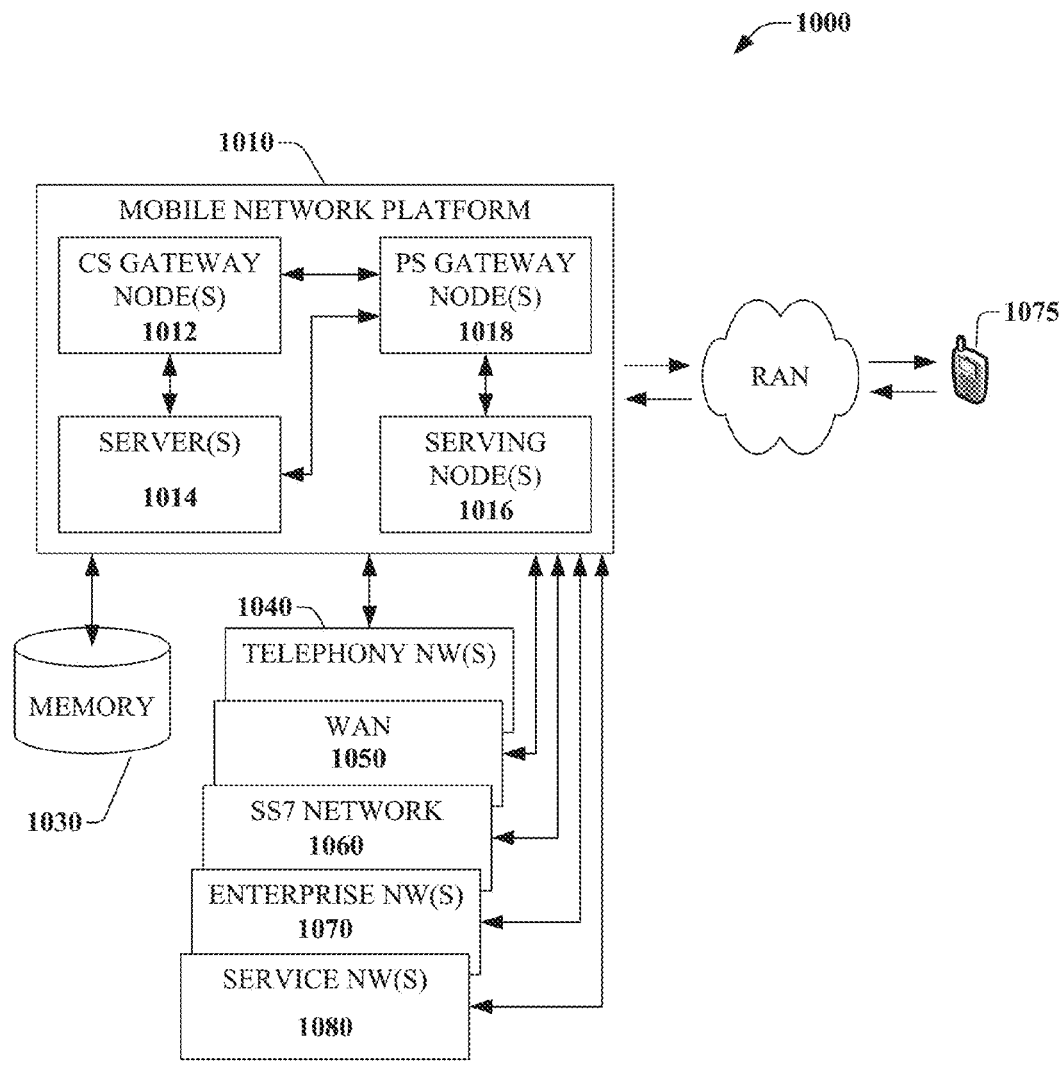
FIG. 10 is a block diagram of an example, non-limiting embodiment of a mobile network platform in accordance with various aspects described herein.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1075.

It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data.

Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A remote radio unit device, comprising:
   a processor; and
   a memory that stores executable instructions that, when executed by the processor, facilitate performance of operations, comprising:
   receiving, by the remote radio unit device, a transmission from a mobile device via a first communication link
   after receiving the transmission from the mobile device, relaying, by the remote radio unit device, the transmission to a baseband unit device that is remotely coupled to the remote radio unit device via a second communications link;
   in response to a passing of a latency period without receiving, by the remote radio unit device, an indication from the baseband unit device that the transmission from the mobile device comprises an error, and in response to a determination by the remote radio unit device indicating that the transmission from the mobile device does not contain the error, sending, by the remote radio unit device, an acknowledgement to the mobile device; and
   in response to the passing of the latency period without receiving, by the remote radio unit device, the indication, and in response to the determination by the remote radio unit device indicating that the transmission contains the error, sending, by the remote radio unit device, a retransmission request to the mobile device to retransmit the transmission.

2. The remote radio unit device of claim 1, wherein the latency period is between the remote radio unit device and the baseband unit device and is greater than three milliseconds.

3. The remote radio unit device of claim 2, wherein the transmission is a first transmission, and wherein the operations further comprise:
   receiving scheduling information associated with a second transmission from the baseband unit device.

4. The remote radio unit device of claim 3, wherein the retransmission request is a first request, and wherein the operations further comprise:
   in response to receiving the scheduling information, sending a second request to the mobile device to transmit the second transmission.

5. The remote radio unit device of claim 1, wherein the baseband unit device is part of a cloud radio access network.

6. The remote radio unit device of claim 3, wherein the receiving the scheduling information further comprises receiving the scheduling information associated with the first transmission, wherein the scheduling information includes a predetermined interval between the first transmission and the second transmission, and wherein the retransmission request is sent during the predetermined interval.

7. The remote radio unit device of claim 6, wherein the predetermined interval is based on an error rate associated with transmissions received from the mobile device, and wherein the transmissions comprise the first transmission and the second transmission.

8. The remote radio unit device of claim 1, wherein the acknowledgement or the retransmission request are sent within three milliseconds of the receiving the transmission.

9. The remote radio unit device of claim 1, wherein the determination indicating that the transmission contains the error comprises executing an error detecting code to check the transmission for the error.

10. The remote radio unit device of claim 1, wherein the operations further comprise:
    receiving a retransmission in response to sending the retransmission request, and wherein the retransmission comprises the transmission that was buffered by the mobile device.

11. The remote radio unit device of claim 1, wherein the operations further comprise:
    decoding the transmission prior to the determination indicating that the transmission contains the error.

12. A method, comprising:
    receiving, by a remote radio unit device comprising a processor, a transmission from a mobile device via a first communications link after receiving the transmission from the mobile device, relaying, by the remote radio unit device, the transmission to a baseband unit device that is remotely coupled to the remote radio unit device via a second communications link;
    in response to a passing of a latency period without receiving, by the remote radio unit device, an indication from the baseband unit device that the transmission from the mobile device comprises an error, and in response to a determination by the remote radio unit device indicating that the transmission from the mobile device does not comprise the error, sending, by the remote radio unit device, an acknowledgement to the mobile device; and
    in response to the passing of the latency period without receiving, by the remote radio device, the indication, and in response to the determination by the remote radio unit device indicating that the transmission comprises the error, sending, by the remote radio unit device, a retransmission request to the mobile device to retransmit the transmission.

13. The method of claim 12, wherein the transmission is a first transmission, and wherein the method further comprises:
    receiving, by the remote radio unit device, scheduling information associated with a second transmission from the baseband unit device.

14. The method of claim 13, wherein the receiving the scheduling information further comprises receiving the scheduling information associated with the first transmission, and wherein the scheduling information includes a predetermined interval between the first transmission and the second transmission, and wherein the retransmission request is sent during the predetermined interval.

15. The method of claim 14, wherein the predetermined interval is based on an error rate associated with transmissions received from the mobile device, and wherein the transmissions comprise a first transmission and the second transmission.

16. The method of claim 12, wherein the latency is between the radio remote radio unit device and a baseband unit device and is greater than three milliseconds.

17. The method of claim 12, further comprising:
receiving, by the remote radio unit device, a retransmission in response to sending the retransmission request, wherein the retransmission comprises a buffered transmission that was buffered in the mobile device.

18. A computer-readable storage device storing executable instructions that, in response to execution, cause a remote radio unit device comprising a processor to perform operations, comprising:
receiving, by the remote radio unit device, a transmission from a mobile device via a first communications link
after receiving the transmission from the mobile device, relaying, by the remote radio unit device, the transmission to a baseband unit device that is remotely coupled to the remote radio unit device via a second communications link;
in response to an elapsing of a latency period without receiving, by the remote radio unit device, an indication from the baseband unit device that the transmission from the mobile device comprises an error, and in response to a first determination by the remote radio unit device that the transmission from the mobile device does not comprise the error, sending, by the remote radio unit device, an acknowledgement to the mobile device; and
in response to the elapsing of the latency period without receiving, by the remote radio unit device, the indication, and in response to a second determination by the remote radio unit device that the transmission comprises the error, sending, by the remote radio unit device, a retransmission request to the mobile device to retransmit the transmission.

19. The computer-readable storage device of claim 18, wherein the latency period is between the remote radio unit device and the baseband unit device and is greater than three milliseconds.

20. The computer-readable storage device of claim 18, wherein the retransmission request is a first transmission request, and wherein the operations further comprise:
receiving scheduling information associated with a second transmission request from the baseband unit device, wherein the scheduling information includes an interval between the second transmission request and the first retransmission request.

* * * * *